March 13, 1934.  A. E. WEINGARTNER  1,951,001
STEAM TURBINE, SPUR GEAR POWER BOX FOR STOKER DRIVES
Filed Feb. 21, 1929   8 Sheets-Sheet 1

Fig. 1.

Inventor -
Anthony E. Weingartner,
by his Attorneys,
Howson & Howson

Fig 5.

March 13, 1934.  A. E. WEINGARTNER  1,951,001

STEAM TURBINE, SPUR GEAR POWER BOX FOR STOKER DRIVES

Filed Feb. 21, 1929  8 Sheets-Sheet 6

Fig 6.

Inventor:-
Anthony E. Weingartner,
by his Attorneys,
Howson & Howson

March 13, 1934.  A. E. WEINGARTNER  1,951,001
STEAM TURBINE, SPUR GEAR POWER BOX FOR STOKER DRIVES
Filed Feb. 21, 1929  8 Sheets-Sheet 8

Inventor:-
Anthony E. Weingartner,
by his Attorneys,
Howson & Howson

Patented Mar. 13, 1934

1,951,001

UNITED STATES PATENT OFFICE

1,951,001

STEAM TURBINE SPUR-GEAR POWER-BOX FOR STOKER DRIVES

Anthony E. Weingartner, Philadelphia, Pa., assignor to American Engineering Company, Philadelphia, Pa., a corporation of Pennsylvania Application February 21, 1929, Serial No. 341,817

20 Claims. (Cl. 74—7)

My invention relates to power apparatus, and it has for one object the provision of a power-box of simple and compact design which is particularly applicable to stoker structures.

Another object of my invention is to provide a power-box, wherein a steam turbine and a power-transmission system are so combined as to form an exceptionally rigid and non-vibrator structure.

Still another object of my invention is to provide power apparatus particularly adapted to stoker structures, characterized by the relatively large range in speeds available.

A further object of my invention is to provide a steam-driven power-box requiring minimum floor space characterized by the fact that the entire driving system is enclosed, so that no moving parts are visible with the exception of the crank shaft.

A still further object of my invention is to provide a lubricating system adapted to insure a constant supply of clean cool lubricant to the several bearings, as well as to the pressure control means for the turbine.

A still further object of my invention is to provide an oil-distribution manifold for the power-box, characterized by the minimum number of parts required, my invention contemplating the forming of the manifold by drilling a recess through an enlarged portion of one wall of the oil-chamber section of the power-box housing.

A still further object of my invention is to provide means, whereby oil accumulating in the chamber portion of the casing containing the chain may be automatically returned to the main oil reservoir upon the movement of the chain, so that the oil in said reservoir may be maintained at approximately a constant level.

With these and other objects and applications in view, my invention further consists in the details of construction and operation and arrangement, hereinafter described and claimed and illustrated in the accompanying drawings, wherein

Referring to the drawings, a stoker 1 is connected by rods 2 to cranks 3 of a driven shaft 4. The shaft 4 extends through openings formed in portions 5 and 6 of spaced side walls 7 and 8 of a housing 9 of a power-box 11, said housing also having front and rear walls 12 and 13, respectively.

A relatively large gear-wheel 14 (Fig. 6) is mounted on a portion of the shaft 4 between the side walls 7 and 8, and it meshes with a relatively small pinion 15 positioned on a shaft 16 journaled in the side walls 7 and 8. The shaft 16 extends through the side wall 7 and carries on the outer end thereof a hub 17. The hub 17 affords a relatively large gear-wheel 18 a rotatable mounting, and it is connected by means of a shearable pin 19 to a plate 21 secured to the hub 17. The gearing so far described constitutes the low-speed, heavy-duty section of the gear system.

Figure 6:
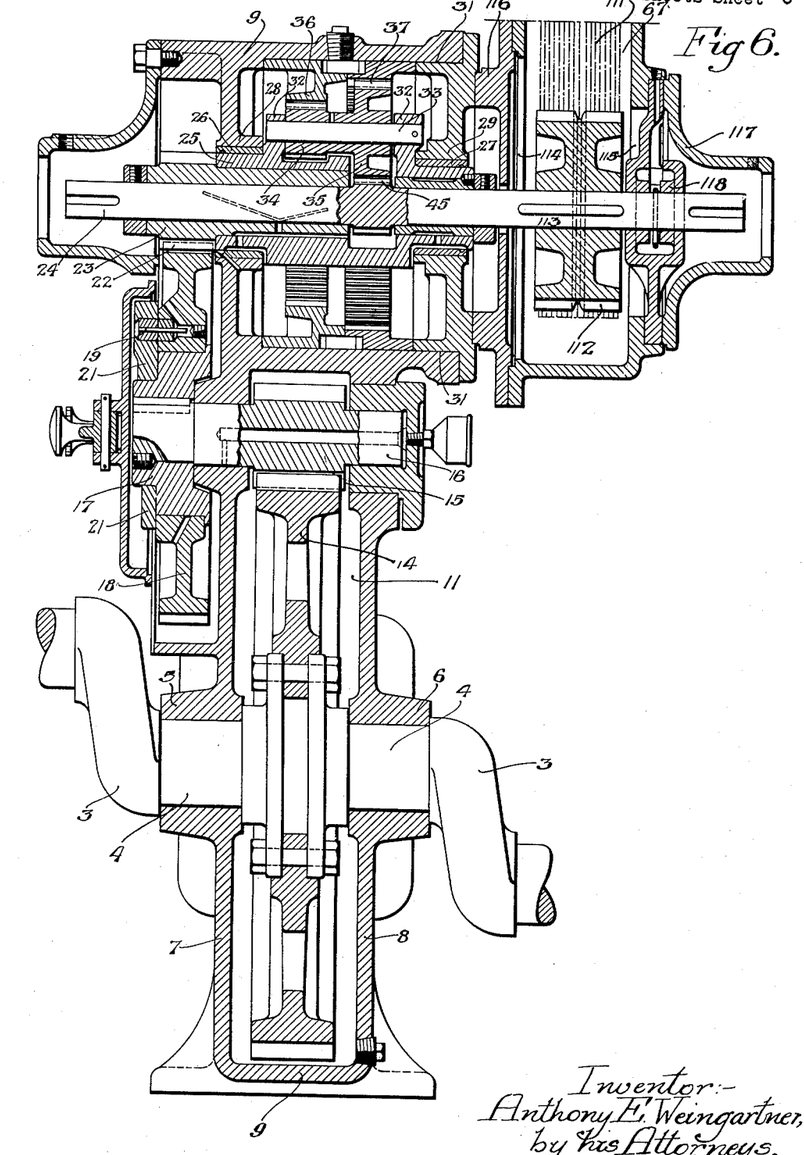
Fig. 6 is a similar view taken on the line 6—6 of Fig. 3.

The gear-wheel 18 meshes with a pinion 22 formed on a sleeve 23 loosely mounted on a horizontally-positioned high-speed shaft 24 extending parallel to the low-speed crank shaft 4. The tubular sleeve 23 is keyed to a sleeve 25, opposite ends of which are journaled in bearings 26 and 27 formed in spaced inwardly-extending flanges 28 and 29, respectively. The flange 28 is integral with the housing 9, while the flange 29 is detachably secured in an opening 31 formed in the housing 9 and serves to close the same. The sleeve 25 is provided with a pair of arms 32 between which extend a non-rotatable spindle 33. The spindle 33 affords a loose mounting for planet gears 34 and 35 of different diameters.

Figure 11:
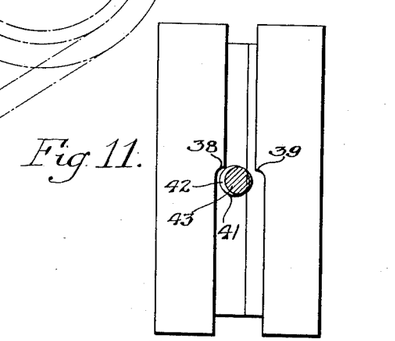
Fig. 11 is a detail view of the orbit gears with their associated cam.
Figure 12:
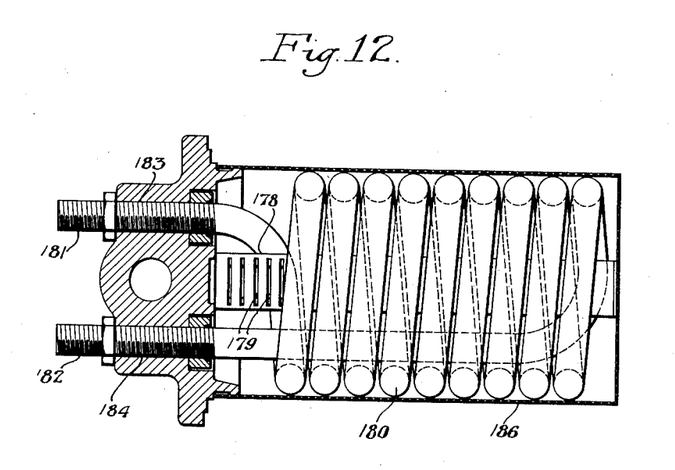
Fig. 12 is an enlarged, detail sectional plan view of the oil-cooling means and associated parts, taken on the line 12—12 of Fig. 2.

The planet gear 34 meshes with an orbit gear 36 rotatably seated in the housing 9, while the planet gear 35 meshes with an orbit gear 37 similarly mounted in the housing 9. The gears 36 and 37 have their adjacent edges so recessed as to form shoulders 38 and 39. As shown in Fig. 11, a cam 41 is mounted on an inner end 42 of a shaft 43, which extends outwardly of the housing 9 to an operating handle 44, the cam 43 being so positioned between the recessed edges of the orbit gears 36 and 37 as to be movable into a gripping engagement with either of said shoulders 38 and 39, in which position, the cam 43 is also self-locking. When the handle 44 is in the mid or neutral position, the cam 41 is out of engagement with either of the shoulders 38 and 39, permitting the free movement of the orbit gears 36 and 37.

The planet gear 35 meshes with a gear-wheel 45, formed on the high-speed shaft 24, so that when the outer shaft is rotated, the planet gears 34 and 35 are turned together. Should the operating handle 44 be so turned from its midposition as to actuate the cam 43 into engagement with the shoulder 38, the orbit gear 36 is held stationary and the planet carrier or sleeve 25 is operated at one speed. Should the other orbit gear 37 be held stationary by an opposite movement of the handle 44, the planet carrier 25 is rotated at a different speed. Thus the speed of the high-speed gear section, which extends from the driving pinion or gear-wheel 45 to the gear-wheel 18, is controlled with these gears permanently in mesh. For a further description of certain of the detail features of the high and low-speed gear sections, reference is made to my co-pending application, Serial No. 588,541, filed February 16, 1922, and assigned to the American Engineering Company.

Figure 1:
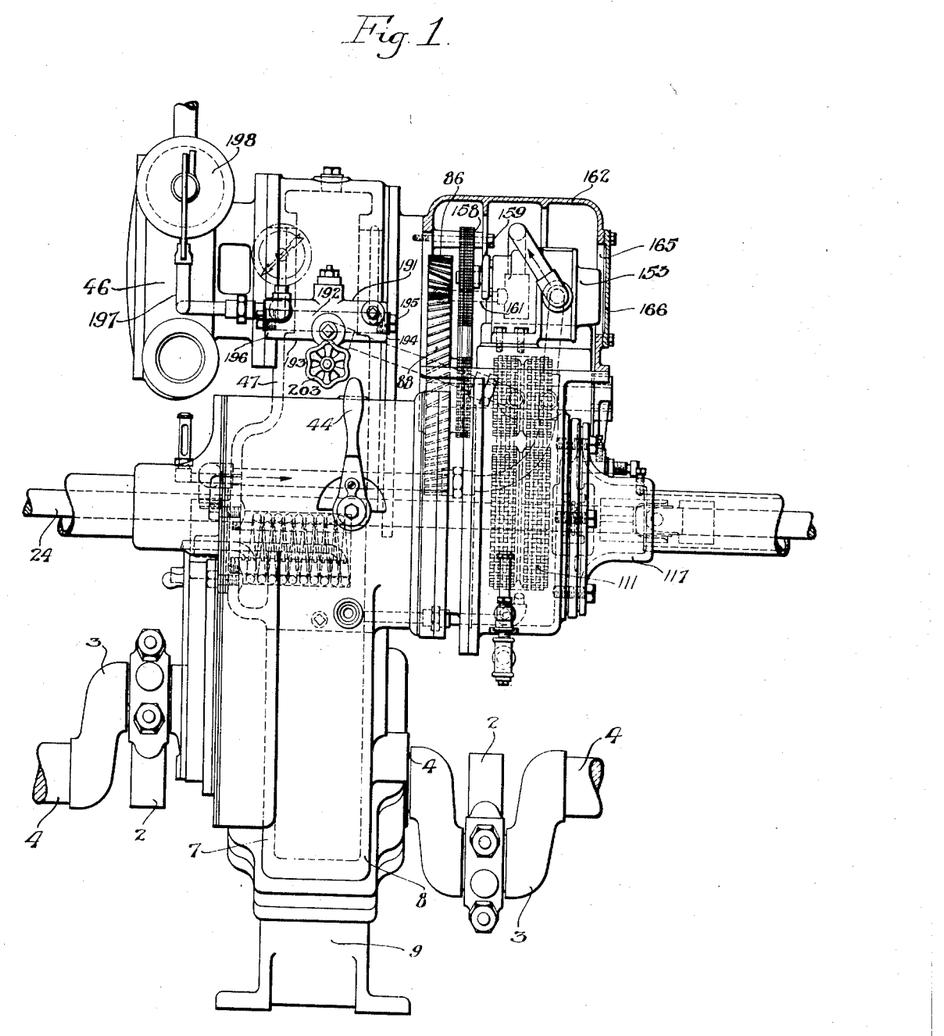
Fig. 1 is a front elevational view of a steam-driven power-box embodying my invention connected to a stoker structure.
Figure 5:
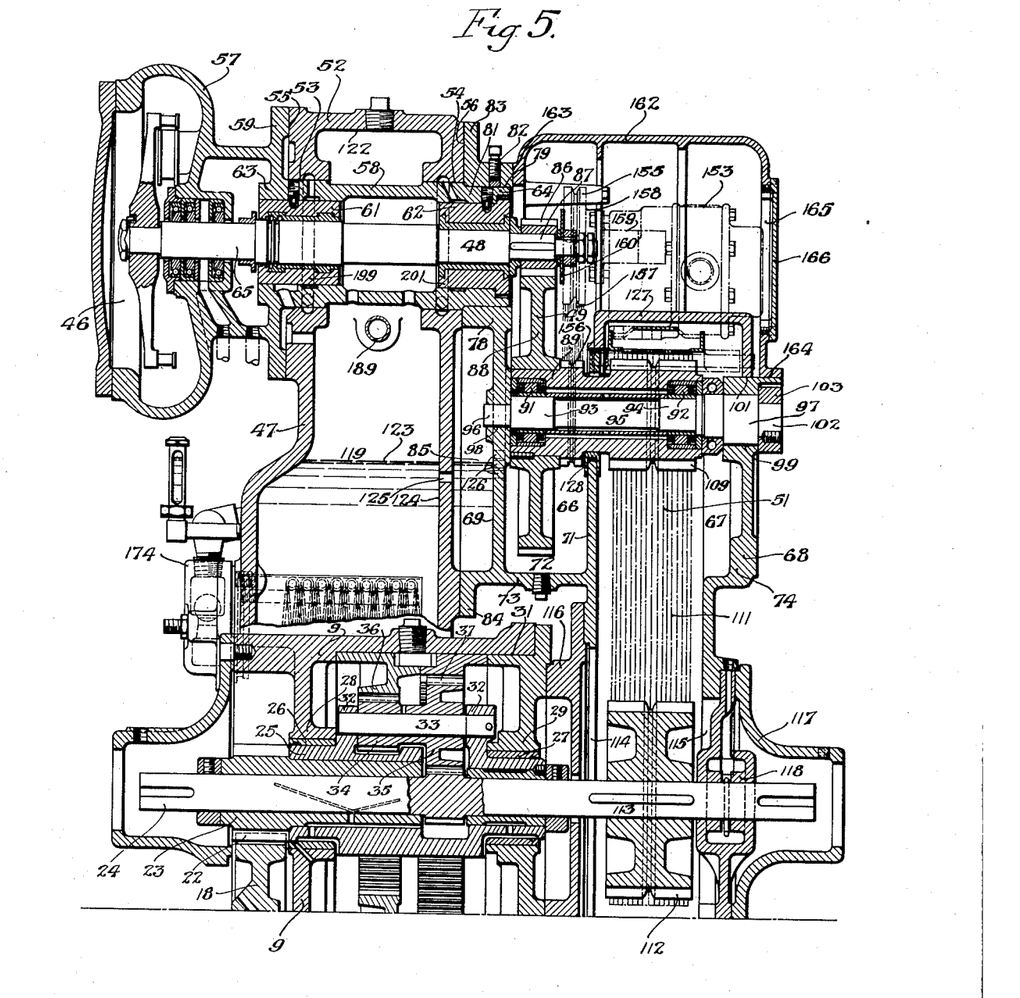
Fig. 5 is an enlarged detail sectional view, taken on the line 5—5 of Fig. 3.

My invention further contemplates the provision of means, whereby the high-speed shaft 24 may be driven by steam rather than by electrical means, thereby affording a large range in speed variation, say, from 10 to 1. To this end, broadly, I mount a steam turbine 46 of conventional design on an upper portion 47 of the housing 9 which extends above the high-speed shaft 24, as shown in Fig. 1 and then connect a shaft 48 of the turbine by gear and chain systems 49 and 51 to the high-speed shaft 24, as illustrated in Fig. 5.

More specifically, an upper end portion 52 of the housing section 47 is provided with apertures 53 and 54 in spaced side walls 55 and 56 thereof. A housing 57 of the turbine is provided with a tubular extension 58, which closely fits the apertures 53 and 54, as well as a peripheral flange 59 which may be bolted or otherwise secured to the side wall 55. Bearings 61 and 62 are respectively positioned in the tubular end portions 63 and 64 of the housing projection 58, whereby an extended portion 65 of the turbine shaft 48 may be rotatably supported in position. Such method of supporting the turbine 46 in the housing 9 assures a rigid, non-vibratory connection therebetween. The mounting of the turbine 46 on the side of the housing 9, so that the turbine shaft 48 is parallel to the high-speed shaft 24 results in an exceedingly compact unit, occupying a minimum amount of floor space and affording maximum accessibility to the principal portions of the power-box.

The gear and chain systems 49 and 51 are respectively mounted in chambers 66 and 67 of a casing 68, as shown in Figs. 1, 3, 4 and 5. The chamber 66 is formed by a pair of side walls 69 and 71, a pair of end walls 72 and a bottom wall 73, while the chamber 67 comprises the inner side wall 71, an outer wall 74, inclined top and bottom walls 75 and 76 (Fig. 3) and a curved end wall 77. The wall 69 is extended above the upper open sides of the chambers 66 and 67 to provide an upper portion 78. The portion 78 is provided with an opening 79 adapted to receive an outer end portion 81 of the extension portion 58 of the turbine housing 57, the end portion 81 being prevented from turning in the aperture 79 by means of locking means 82, and by the securing means of flange 59.

The portion 78 is also provided with a flange 83 which abuts against the side 56 of the housing portion 47 and may be secured thereto by bolts or other means. The lower portion of the wall 69 is provided with a flange 84, which is positioned in abutting relation with the side 56 of the housing portion 47 and which is connected with the upper flange 83. Thus, a chamber 85 is formed between the side wall 56 and the side wall 69 which is positioned below the turbine shaft extension 48.

The gear system 49 comprises a driving pinion 86, which is mounted on an overhanging end portion 87 of the turbine shaft extension 48 and which meshes with a relatively large gear-wheel 88 keyed on an inner end portion of a tubular shaft 89. The shaft 89 is rotatably mounted on its inner and outer ends on anti-friction devices 91 and 92 respectively carried on eccentric portions 93 and 94 of a jack shaft 95. End portions 96 and 97 of the jack shaft 95 are journaled respectively in apertures 98 and 99 positioned immediately adjacent to horizontal upper edge portions 101, 101 of the casing walls 71 and 74.

An outer end portion 102 (Fig. 3) of the jack shaft 95 is provided with an arm 103 having at one end micrometer-adjusting means 104, whereby the jack shaft 95 may be turned through a predetermined angle. The micrometer adjusting means 104 comprises a pair of oppositely-positioned set screws 105 and 106 which extend into an enlarged opening 107 in the outer end of the arm 103. A stationary bolt 108 extends from the casing 68 between the adjacent inner ends of the set screws 105 and 106 and constitutes an abutment therefor. When it is desired to impart a predetermined angular movement to the jack shaft 95, one of the set screws 105, 106 is loosened while the other is tightened. When the jack shaft 95 is turned in this manner, the position of the rotatable shaft 89 and hence that of the gear-wheel 88 is adjusted bodily relative to the pinion 86. Thus, the distance between the intermediate tubular shaft 89 and the turbine shaft 48 may be varied, thereby insuring the proper meshing of the gear-wheel 88 with the driving pinion 86.

The chain system 51 comprises a sprocket-wheel 109 which is mounted on an outer end of the intermediate tubular shaft 89 in the chamber 67 between the walls 71 and 74. The sprocket-wheel 109 is connected by means of a chain 111 with a second sprocket-wheel 112 mounted on an outer end portion 113 of the high-speed shaft 24 which extends through openings 114 and 115 in the opposite walls 71 and 74 of the chamber 67. Should slack occur in the chain 111, this may be compensated by properly turning the set screws 105 and 106 of the micrometer-adjusting means 104. The gear and chain transmission systems 49 and 51 thus afford an easily adjustable and flexible connection between the turbine shaft 65 and the high-speed shaft 24.

As shown in Fig. 5, the opening 114 in the side wall 71 is closed by means of a circular plate 116 which is secured to the adjacent portion of the casing wall 71, as well as to the closure plate 29. The opening 115 is closed by means of a member 117 which is provided with a bearing 118 for the outer end portion of the high-speed shaft extension 113.

My invention further embodies a simple and efficient system of lubrication for the various bearings of the power-box, the upper housing portion 47 being so formed as to provide a chamber or reservoir 119 which extends from a lower wall 121 thereof upwardly between side walls 55 and 56 to an upper wall 122 positioned just above the extension 58 of the turbine housing 57. The chamber 119 is preferably filled with oil or other lubricating material to a level indicated at 123.

A lower portion 124 of the side wall 56 is provided with a series of apertures 125, extending across the width thereof, which are positioned just below the upper level 123, permitting oil to pass from the chamber 119 into the chamber 85. The chamber 85 is connected to the chamber 66 of the casing 68 by means of a plurality of apertures 126, so that oil is also present in the chamber 66. The passage of oil from the chamber 66 to the chamber 67 is prevented by means of a cover member 127, which encloses the upper side of the chamber 67 and which is mounted on the upper horizontal edges 101 of the walls 71 and 74. Packing 128 is positioned between the wall 71, the cap 127 and the rotatable tubular shaft 89, so as to prevent other than a predetermined limited passage of oil into the chamber 67 at this point, such as is necessary for lubrication.

Figure 9:
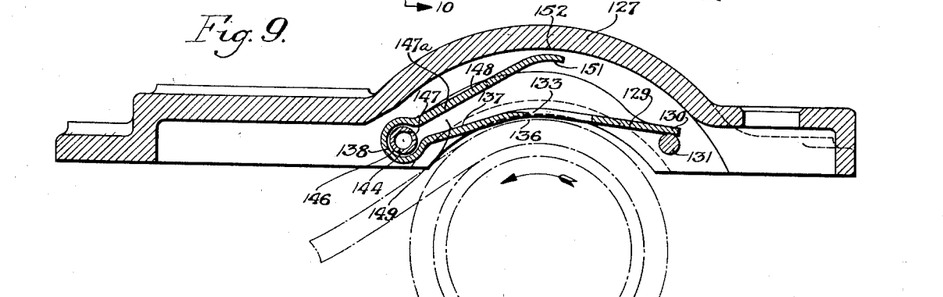
Figs. 9 and 10 are longitudinal and transverse vertical sectional views taken on the lines 9—9 and 10—10 of Fig. 8, respectively.

The accumulation of oil in the chamber 67 is prevented by means of the device shown in Figs. 5, 8, 9 and 10, wherein it will be noted that a curved plate 129 has an outer end portion 130 supported on a pin 131 extending between side walls 132 of the cover member or cap 127. An intermediate portion 133 of the plate 129 is slightly curved and provided with an aperture 134, one edge 135 of which is beveled to form a scraping edge, as shown in Fig. 9, and positioned just above a top portion 136 of the chain system 51, so that a portion of the oil carried upwardly by the chain 111 is removed therefrom and not returned again to the base portion of the chamber 67. The oil thus removed flows over a downwardly-inclined rear portion 137 of the plate 129 into a tubular base portion 138.

Opposite ends 139 and 141 (Fig. 10) of the tubular portion 138 of the plate 129 are provided with inwardly-extending flange portions 142 and 143 which closely fit a pipe 144. The pipe 144 is supported in and extended through the opposite side walls 132 of the cover member 127. The oil flowing down the plate portion 137 accumulates in a recess 145 between an intermediate portion 146 of the pipe 144 and the tubular plate portion 138. The intermediate portion 146 is provided with a plurality of apertures 147, so that the oil may readily pass into the pipe 144. The ends of the pipe 144 open into the casing 68, the inner end opening directly into the chamber 66, permitting the oil passing therefrom to drain back into the chamber 66.

Figure 10:
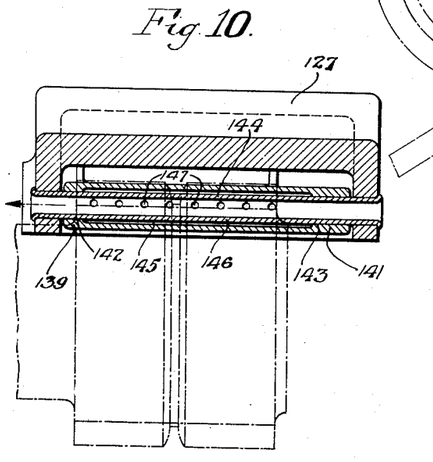

An upper edge 147a of the tubular portion 138 is extended upwardly toward the free end 130 of the plate 129 by means of a plate portion 148, thereby forming with the rear end portion 137 a chamber 149 in which the oil may accumulate in the event that it does not immediately drain through the discharge pipe 144. An end 151 of the bent-back wall portion 148 is somewhat resilient and engages an upper side 152 of the cap member 127, whereby the plate 129 may be resiliently held in position. Should such oil-collecting means not be used in the chamber 67, the oil would not only accumulate therein to an undesirable extent, but difficulty would also be had in maintaining the proper oil level in the main reservoir 119.

An oil pump 153 of conventional design may be bolted on a front portion 154 of the cover member 127, and it is driven by means of chain mechanism 155. The mechanism 155 comprises a sprocket-wheel 156, which is secured on the tubular shaft 89 between the gear-wheel 49 and the wall 71, a connecting chain 157, and a second sprocket-wheel 158. The sprocket-wheel 158 is mounted on an upper end of a shaft 159 of the pump 153.

The lubrication of the gear system 49, as well as the chain mechanism 155, is accomplished by means of a rotary plate 160 (Fig. 5) which is mounted on the turbine-shaft end portion 87 just beyond the drive gear 86. The rotary plate 160 is of such diameter as to extend beyond the meshing point of the gear-wheels 49 and 86 so as to be in the path of travel of the oil which is forced from between these two gear wheels. The oil striking the rotary plate 160 is thrown outwardly by centrifugal force, thereby assuring a proper lubrication of adjacent rotary parts. The lubrication of these parts may also be effected by means of a pipe 161 carrying oil under pressure from the pump 153, as shown in Fig. 1.

As shown in Figs. 1, 3, 4 and 5, the oil thrown by the rotary plate 160 is confined to the space immediately adjacent to the chamber 66 by means of a cover member or housing 162 which encloses the open upper side of the chamber 66, the cover member 127 for the chamber 67, the pump 153, the gear system 49 and the pump-driving mechanism 155. An inner end portion 163 of the housing 162 abuts against the outer surface of the side wall 69 and its extended portion 78, while lower edge portions 164 are mounted on the upper horizontal edges 101 of the casing 68. An outer end of the cover member 162 is provided with an opening 165 and a removable closure plate 166, whereby access may be had to the parts within the cover member 162.

The pump 153 is provided with suction and discharge pipes 167 and 168 which extend therefrom downwardly through apertures 169 and 171 in the rear end portion of the cover plate 127. The suction and discharge pipes 167 and 168 are then extended outwardly of the power-box through the openings 172 and 173 formed in the rear wall portion of the chamber 67. The suction pipe 167 terminates in the valve plate 174 positioned on the side wall 55 immediately adjacent to the base portion of the oil chamber 119.

Figure 2:
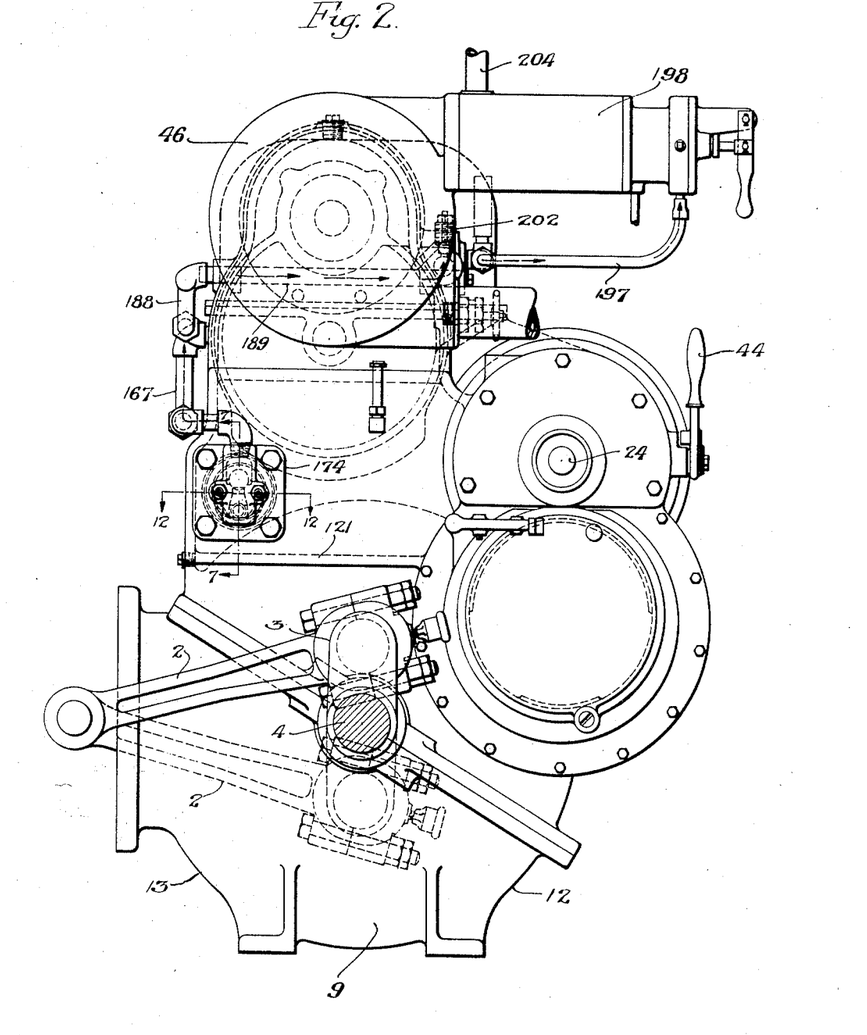
Figs. 2 and 3 are side elevational views of the power-box shown in Fig. 1 looking from the left and right, respectively.
Figure 3:
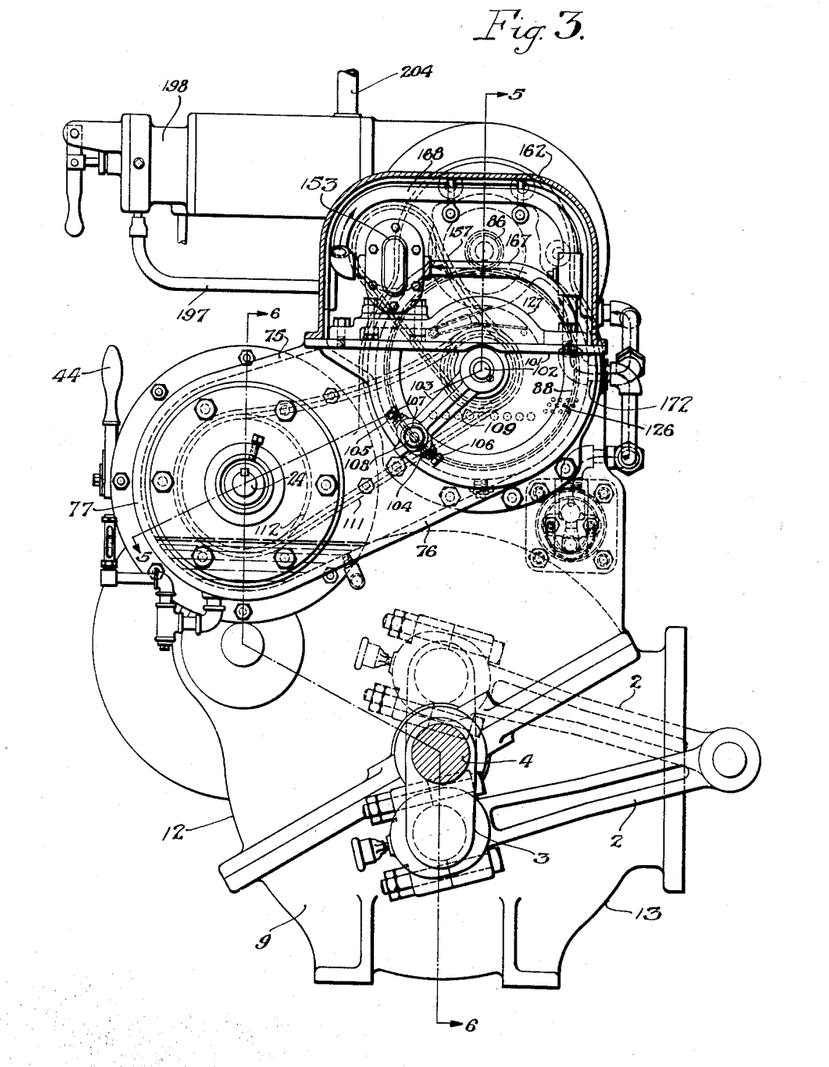
Figure 4:
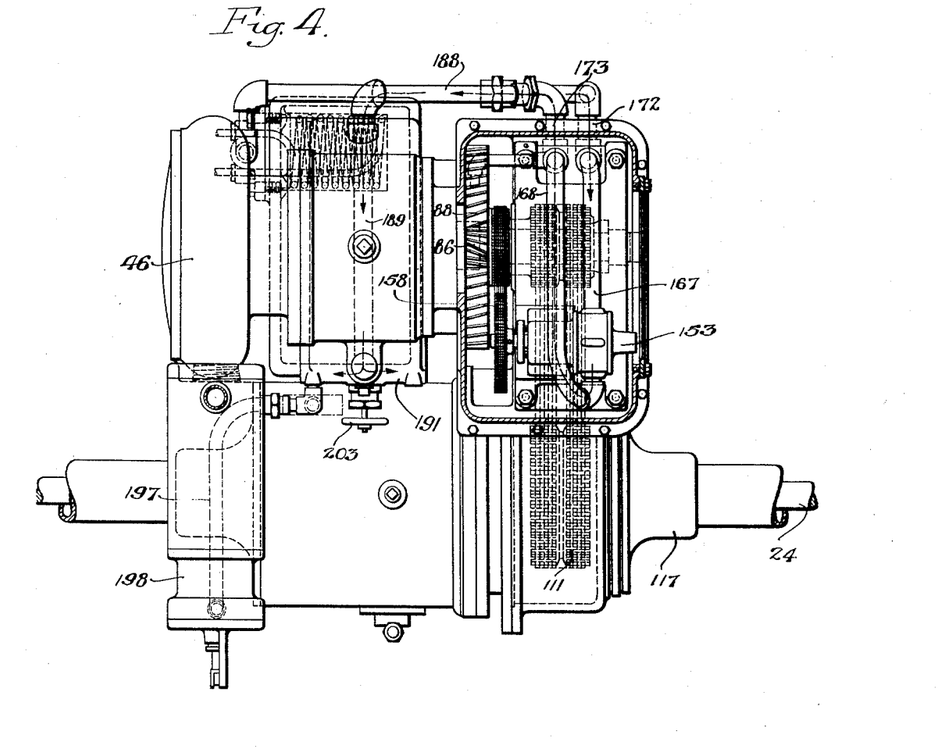
Fig. 4 is a top plan view of the power-box of Fig. 1, with the cover member for the pump shown in horizontal section.

The valve plate 174 (Figs. 2, 5 and 7) is provided with a vertical passage 175 in communication with the suction pipe 167. The passage 175 is provided with a restricted portion forming a seat 176 for a ball valve 177 adapted to prevent a reverse flow of the oil through the suction pipe 167 thereby insuring a constant supply of oil in the suction pipe 167. The portion of the passage 175 beyond the valve 177 is connected to a suction pipe 178, which extends through the adjacent portion of the wall 55 into the bottom portion of the oil chamber 119, and it is provided with a plurality of slotted openings 179. In order that the oil may be cooled, a tubular cooling coil 180 is positioned in the lower portion of the chamber 119 so as to surround the suction pipe 178. Opposite ends 181 and 182 of the coil 180 extend through the wall 55 to openings 183 and 184 in the valve plate 174, respectively, the latter openings being connected by pipes 185 to a cooling system (not shown).

Figure 7:
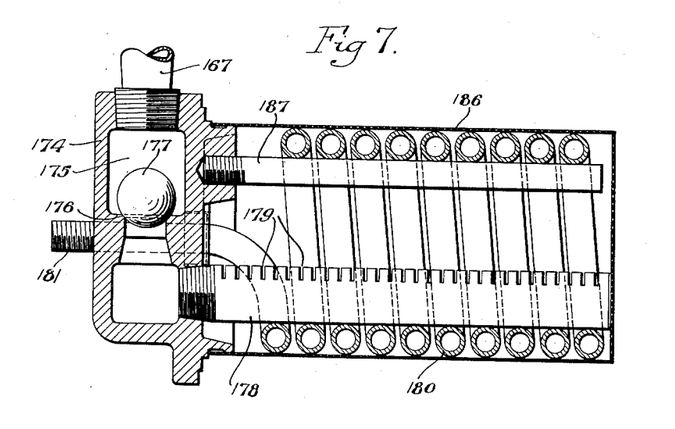
Fig. 7 is an enlarged, detail vertical sectional view of the oil-cooling means and associated parts, taken on the line 7—7 of Fig. 2.
Figure 8:
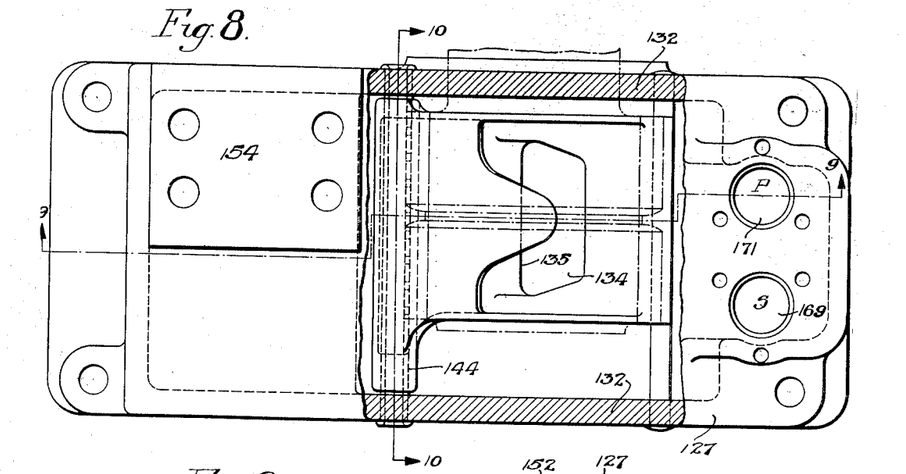
Fig. 8 is an enlarged view of the cover member for the chain-mechanism section of the power-transmission system.

The cooling coil 180, as well as the suction pipe 178, are enclosed by means of a tubular screen 186 which extends outwardly from the valve plate 174, whereby only clean oil may be supplied to the suction pipe 178. A supporting rod 187 extends inwardly from the valve plate 174 just below the upper side of the cooling coil 180, so that the latter may be rigidly secured in position. The cooling coil 180, the screen 186, the suction pipe 178, and the valve plate 174 thus constitute the removable unit which may be easily detached from the power-box for purposes of replacement or repair.

The pressure pipe 168 is provided with a section 188 positioned exteriorly of the power-box and a section 189 which extends through the oil chamber 119, just below the turbine extension 58, between the front and rear walls 12 and 13, respectively, of the power-box housing 9. In accordance with my invention, the pipe section 189 is core cast.

A still further feature of my invention is the provision of a distributing manifold 191 in the upper front wall portion of the housing section 47, comprising an aperture 192 which is drilled horizontally in a tubular housing portion 193. The formation of the manifold 191 of an integral portion of the housing 9 permits the elimination of the numerous pipes and fittings characteristic of such structures. One end 194 of the aperture or boring 192 is closed by means of a plug 195, while an opposite end 196 is connected by means of a pipe 197 to a governor 198 for the turbine 46.

The manifold 191 is also connected by passages 199 and 201 to the spaced bearings 61 and 62 for the turbine-shaft extension 48. A safety valve 202 is also connected to the manifold 191. A by-pass valve 203 is connected to the manifold 191 and to the oil chamber 119, whereby the pressure of the oil in the manifold 191 may be controlled. The governor 198 for the turbine 46 is so designed that when the by-pass valve 203 is fully opened, the speed of the turbine 46 is a maximum, but that when the valve 203 is fully closed, the speed of the turbine 46 is a minimum, thereby providing desired range in speed variation of the turbine shaft 48.

In operation, assuming the turbine is supplied with steam through a pipe 204 and the control valve 203 fully closed, the speed of the turbine is a minimum. If the control lever 44 is now moved to the right of its mid-position, the orbit gear 37 is locked, resulting in the relatively slow movement of the gear system connecting the high-speed shaft 24 and the stoker shaft 4. Should the lever 44 be moved in the opposite direction from its mid-position, the orbit gear 36 is held stationary, so that the operating speed of the shaft 4 is slightly increased. Should it be desired to operate the shaft 4 at an increased speed, the by-pass valve 203 is opened slightly, permitting the turbine 46 to operate at a higher rate of speed. The speed of the shaft 4 may now be adjusted above or below that determined by the turbine 46 merely by moving the handle 44 to the right or left.

The operation of the turbine-driven intermediate shaft 89 through the chain system 155 causes the turning of the pump 153, with the result that cooled lubricating oil is drawn from the main oil reservoir 119 through the screen 186 into the suction pipe 178, and is finally distributed to the various parts of the power-box from the manifold 191. Such oil as passes into the chamber 67 around the packing 128 is returned to the chamber 66 and out into the main reservoir 119 through the openings 125 and 126, by means of the oil-collector device immediately below the cover member 127.

While I have shown only one embodiment of my invention, for the purpose of describing the same and illustrating its principles of construction and operation, it is apparent that various changes and modifications may be made therein, without departing from the spirit of my invention. I desire, therefore, that only such limitations shall be imposed thereon, as are indicated in the appended claims or as are demanded by the prior art.

I claim:

1. A power-box comprising a turbine provided with a shaft, a high-speed shaft, a third shaft adapted to be connected to stoker apparatus, a combined gear and chain mechanism extending between said turbine shaft and said high-speed shaft, means for adjusting the tension in said chain mechanism and for adjusting the position of at least one of the gear-wheels in said gear system, and means for operatively associating said high-speed shaft and said third-mentioned shaft including high and low-speed sections.

2. A power-box provided with a housing, a turbine mounted on said housing provided with a shaft, a casing secured to said housing, power-transmission means for said shaft supported by said casing, said casing having a plurality of chambers for said power-transmission means, a transmission gear system in said housing comprising an element projecting into one of said chambers, and means in said chamber for operatively connecting the said element with said power-transmission means.

3. Apparatus comprising, in combination, a housing having a wall provided with an opening, a gear system in the housing including a shaft extending through said opening, a casing mounted on the housing and having a plurality of chambers one of which embraces the projecting end of said shaft, and power-transmission means connected with said shaft including gearing positioned in one of said chambers, and chain mechanism positioned in another of said chambers.

4. Apparatus comprising, in combination, a housing having a wall provided with an opening, a casing secured to said housing and having an extension seated in said opening, a shaft journaled in said extension and projecting into the housing, a second casing having a plurality of chambers provided with open upper sides, one of the walls of said second casing being secured to an adjacent wall of said housing, power-transmission means extending from said shaft including gearing positioned in one of said chambers, chain mechanism positioned in another of said chambers, means for enclosing the upper open side of both of said chambers, and closure means for the open side of one of said chambers only.

5. Apparatus of the character described comprising a housing, a turbine shaft extending from said housing, a casing provided with a plurality of chambers having open upper sides, one wall of said chambers being secured to an adjacent wall of said housing, a shaft carried by said casing adjacent to the open upper sides of said chambers, a gear-wheel mounted on said shaft and extending into one of said chambers, means for connecting said gear-wheel and said turbine shaft, and power-transmission means extending from said second-mentioned shaft into the other of said chambers.

6. The combination with a power-box housing having spaced openings, of a turbine casing provided with an extension positioned in said openings, a turbine shaft positioned in said extension, a casing, one wall of which is secured to said housing and provided with an opening adapted to receive an end portion of said turbine extension, said casing having a plurality of separate chambers, and power-transmission means extending from said shaft positioned in said chambers.

7. A power-box provided with a housing, a turbine having a shaft extending through said housing, a high-speed shaft extending from said housing, power-transmitting means extending between said shafts, and a casing secured to said housing for supporting said power-transmission means, said casing having an opening through which said high-speed shaft extends, said power-transmitting means including a sprocket-wheel mounted on said high-speed shaft in said casing.

8. In a power-box adapted for stoker operation, the combination with a housing, of a low speed shaft journaled in the bottom of said housing, a high speed shaft journaled in said housing, and interconnected low and high speed gear systems mounted in said housing and respectively connected with said shafts, a casing secured to said housing and having a part embracing a projecting end of said high speed shaft, a motor mounted on said housing, and transmission mechanism supported in said casing operatively connecting said motor with the said projecting end of said high speed shaft.

9. In a power-box adapted for stoker operation, the combination with a housing, a low speed shaft journaled in the bottom of said housing, a high speed shaft journaled in said housing in parallel relation with the low speed shaft, interconnected high and low speed gear systems mounted in said housing and respectively connected with said shafts, a casing detachably secured to said housing, a third shaft journaled in said housing in parallel relation with said high and low speed shafts, a motor mounted on said housing and operatively connected with the third shaft, and transmission mechanism supported in said casing for operatively connecting the third shaft with the said high speed shaft.

10. In a power-box adapted for stoker operation, the combination with a housing, of high and low speed shafts journaled in parallel relation in said housing, interconnected high and low speed gear systems mounted in said housing and respectively connected with said shafts, said high speed shaft projecting through a wall of said housing, a casing secured to said housing and having a part embracing the projecting end of said high speed shaft, a jack shaft journaled in said casing, a motor shaft mounted in said housing, said jack and motor shafts paralleling the high and low speed shafts and the jack shaft overlying the projecting end of said high speed shaft, transmission elements operatively connecting the jack shaft with the high speed shaft and with the motor shaft, and a motor mounted on said housing and connected with the motor shaft.

11. In a power-box adapted for stoker operation, the combination with interconnected high and low speed gear systems, and a housing therefor, a shaft connected with said high speed system and projecting through a wall of said housing, a casing mounted on said housing and having separable sections, one of said sections embracing the projecting end of said high speed shaft, a motor shaft mounted in said housing, and a motor operatively connected with said motor shaft, and transmission mechanism mounted in said casing and operatively connecting the motor shaft with the high speed shaft.

12. In a power-box adapted for stoker operation, the combination with interconnected high and low speed gear systems, and a housing therefor, of a shaft extending from said high speed system and projecting through a wall of said housing, a casing secured to said housing and comprising separable sections, one of which embraces the projecting end of said high speed shaft, a motor supported on and a motor shaft supported in said housing, a jack shaft journaled in said casing, transmission elements connecting said jack shaft with the high speed shaft, and transmission elements connecting said jack shaft with the motor shaft.

13. In a power box adapted for stoker operation, the combination with interconnected high and low speed gear systems, and a housing therefor, of a shaft projecting from said high speed system through a wall of said housing, a casing secured to said housing and having a chamber embracing the projecting end of said shaft, a jack shaft journalled in said casing and intersecting said chamber, a cover plate segregating said chamber from the interior of said casing, transmission elements in said chamber connecting the jack shaft with the high speed shaft, a motor mounted on and a motor shaft supported in said housing, and transmission elements operatively connecting the motor shaft with the jack shaft.

14. In a power-box adapted for stoker operation, the combination with interconnected high and low speed gear systems, and a housing therefor, of a shaft extending from said high speed system through a wall of said housing, a casing mounted on said housing and comprising a plurality of chambers, one of said chambers embracing the projecting end of said high speed shaft, a jack shaft journaled in said housing section and intersecting said chambers, transmission elements in the one of said chambers connecting the jack shaft with the said high speed shaft, a motor shaft supported in said housing and projecting into one of said chambers, transmission elements in the latter chamber connecting the jack shaft with the inwardly projecting end of said motor shaft, and a motor mounted on said housing and operatively connected with the motor shaft.

15. In a power-box adapted for stoker operation, the combination with interconnected high and low speed gear systems, and a housing therefor, a casing mounted on said housing, a shaft extending from said high speed system through a wall of said housing and into said casing, a jack shaft journaled in said casing parallel with said high speed shaft, sprocket wheels on the projecting end of said high speed shaft and on the jack shaft, a chain connecting said sprocket wheels, a motor, a motor shaft supported in said housing, and gears operatively connecting the jack shaft with said motor shaft.

16. In a power-box adapted for stoker operation, the combination with interconnected high and low speed gear systems, and a housing therefor, of a casing mounted on said housing and having a depending extension abutting one side of the latter, a shaft extending from said high speed system through a wall of the housing and into said extension, a jack shaft mounted in said casing above said extension, sprocket wheels on said jack shaft and on the high speed shaft, a chain connecting said sprockets, a motor, a motor shaft supported in said housing, and gearing connecting the jack shaft with the motor shaft.

17. In a power-box adapted for stoker operation, the combination with interconnected high and low speed gear systems, and a housing therefor, of a casing mounted on the first-named housing and having a depending extension abutting one side of the latter, a shaft extending from said high speed system through a wall of the housing and into said extension, a motor mounted on and a motor shaft supported in said housing, and transmission mechanism operatively connecting the motor shaft with the said projecting end of the high speed shaft.

18. In a power-box adapted for stoker operation, the combination with a housing, of speed reduction gearing mounted in said housing, said housing having a transverse opening, a motor casing having an extension adapted to enter and seat in said transverse housing portion, means for securing said casing to the housing, a shaft journaled in said extension, a motor in said casing operatively connected with the shaft, and means for connecting said shaft with the transmission mechanism.

19. In a power-box adapted for stoker operation, the combination with a housing, interconnected high and low speed gear systems mounted in said housing a casing secured to said housing, a shaft extending from said high speed system into said casing, said housing having a transverse opening, a motor casing having an extension adapted to enter and seat in said opening, means for securing said motor casing to said housing, a shaft journaled in said motor casing extension, a motor in said casing operatively connected with said shaft, and transmission mechanism in said first mentioned casing for connecting the motor shaft with the high speed shaft.

20. In a power-box, the combination with a housing, of transmission mechanism mounted in said housing and including a rotary shaft, a member mounted for rotary movement in said housing and having eccentric portions constituting bearings for said shaft, an arm on said member whereby the said member may be adjusted about its axis, a stud on said casing, and a pair of screws carried by said arm and engaging opposite sides of said stud and constituting micrometer means for adjusting the arm and said member into desired positions.

ANTHONY E. WEINGARTNER.